United States Patent [19]

Arimura et al.

[11] 3,938,180

[45] Feb. 10, 1976

[54] COLOR TELEVISION SIGNAL RECORDING EMPLOYS CHROMINANCE BELOW LUMINANCE SPECTRUM AND COLOR BURST TO CORRECT TIMING VARIATIONS

[75] Inventors: Ichiro Arimura, Kyoto; Hiroshi Taniguchi, Hirakata; Hiromichi Tanaka, Kadoma, all of Japan

[73] Assignee: Matsushita Electric Industrial Co., Ltd., Osaka, Japan

[22] Filed: Feb. 26, 1974

[21] Appl. No.: 445,922

Related U.S. Application Data

[63] Continuation of Ser. No. 163,272, July 16, 1971, abandoned.

[30] Foreign Application Priority Data
July 20, 1970 Japan.............................. 45-64105
Dec. 9, 1970 Japan............................. 45-109905

[52] U.S. Cl. ................................................ 358/8
[51] Int. Cl.² ...................... H04N 5/76; H04N 9/02
[58] Field of Search...178/5.4 CD; 360/36, 33; 358/8

[56] References Cited
UNITED STATES PATENTS
3,626,087   12/1971   Tomioka ...................... 178/5.4 CD
3,629,491   12/1971   Dann............................ 178/5.4 CD

*Primary Examiner*—Robert L. Griffin
*Assistant Examiner*—George G. Stellar
*Attorney, Agent, or Firm*—Stevens, Davis, Miller & Mosher

[57] ABSTRACT

A signal processing system for obtaining a continuous signal, phase locked to a signal subjected to timing variations. The continuous signal phase locked to a signal subjected to timing variations is obtained from a variable oscillator, whose oscillation is controlled according to an error signal produced from a phase comparator in accordance with the phase difference between the signal subjected to timing variations and a higher-frequency signal produced from the output of said variable oscillator in the presence of a fixed oscillator.

3 Claims, 9 Drawing Figures

COLOR TELEVISION SIGNAL RECORDING EMPLOYS CHROMINANCE BELOW LUMINANCE SPECTRUM AND COLOR BURST TO CORRECT TIMING VARIATIONS

This is a continuation of application Ser. No. 163,272, filed July 16, 1971, now abandoned.

This invention relates to signal processing systems.

It is well known in the art that, to demodulate a signal including as frequency components a luminance signal and a quadrature modulated color signal, such as the NTSC and PAL composite color television signals into the original color signals, as is usually employed in color television receivers, a continuous signal locked in frequency and phase to the color burst intermittently transmitted as the color reference signal for successive horizontal scan periods, is produced. Well known circuits for obtaining a continuous signal from the color burst include APC and ringing oscillator circuits. In color television receivers, these circuits use crystal oscillators. Thus, their temperature stability is superior. However, their pull-in range is extremely narrow, of the order of about ± 0.02 percent at the most.

When the composite color television signal as noted above is recorded and reproduced by a recording and reproducing system such as a simple video tape recorder, the reproduced signal is usually subjected to timing variations of the order of about 1 percent pp. If such reproduced signal is coupled to the APC circuit (or ringing oscillator circuit) in color television receivers, and a phase locked continuous signal cannot be obtained since the timing variation far exceeds the pull-in range. Therefore, correct color signals cannot be recovered by demodulation.

Accordingly, in the recording and reproduction of the composite color television signal with a simple video tape recorder, it is usual to remove the timing variation or jitter component introduced into the reproduced modulated color signal. In a well-known method of removing the jitter component in the modulated color signal, a continuous signal different in frequency but having the same amount of timing variation as in the reproduced modulated color signal is produced and which is heterodyned with the modulated color signal to thereby obtain the jitter-free modulated color signal. In one well-known method of obtaining a continuous signal having the same amount of timing variation as in the reproduced modulated color signal, the color burst extracted from the reproduced modulated color signal is used to produce a continuous signal phase locked to the extracted color burst in an APC circuit. Unlike the APC circuit in color television receivers, the APC circuit in simple video tape recorders usually employs a Hartley or Colpitts type LC oscillator. In this case, an APC pull-in range of up to 15 KHz (horizontal sync frequency), which is nearly the theoretical maximum range, may be achieved.

However, in APC circuits using LC oscillators, unlike those using crystal oscillators, the drift of the center frequency of the variable oscillator due to ambient temperature variations is very great, so that the APC pull-in range is practically reduced. Thus, the operation of these APC circuits is very unstable.

The primary object of the invention is to overcome the above drawbacks by the provision of an improved APC circuit, which has a broad pull-in range and whose temperature stability is excellent.

Another object of the invention is to provide a system for stably and precisely removing the timing variation component introduced into the modulated color signal in composite color television signals recorded and reproduced with simple video tape recorders.

The above and other objects, features and advantages of the present invention will become more apparent from the following description in conjunction with the accompanying drawings, in which.

Figure 1:
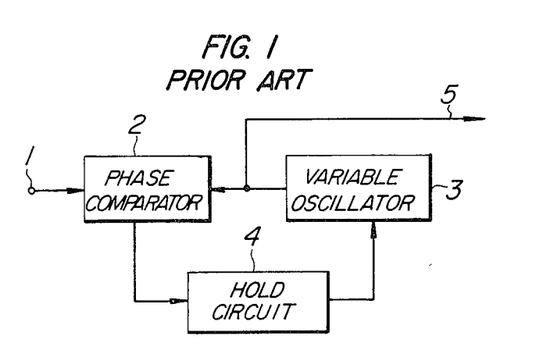
FIG. 1 is a block diagram showing a typical prior-art APC circuit.

FIG. 1 shows the usual APC circuit. The burst signal is coupled to a terminal 1. A phase comparator 2 compares the phase of the burst signal and the phase of the output of a variable oscillator 3, and provides a phase error signal, which is fed to a hold circuit 4 to control the phase of oscillation of the variable oscillator 3 so that the oscillator 3 produces a continuous signal locked in phase to the burst signal. The continuous signal appears at an output terminal 5.

The variable oscillator 3 is usually a crystal oscillator in a color television receiver. In color video tape recorders, it is constructed by combining an LC oscillator and a variable capacitor.

Figure 2:
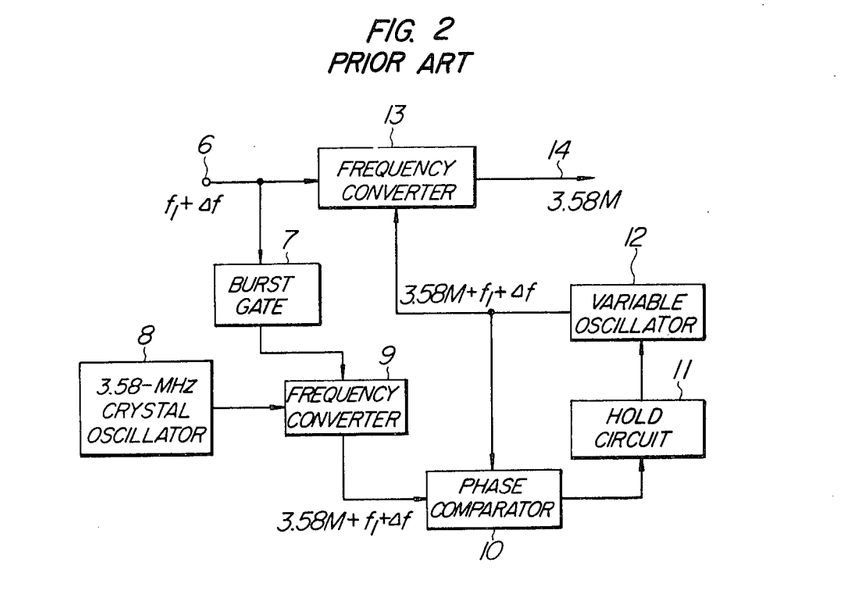
FIGS. 2, 3 and 4 are block diagrams showing prior-art examples of the circuit for removing the jitter component introduced into the modulated color signal.
Figure 3:
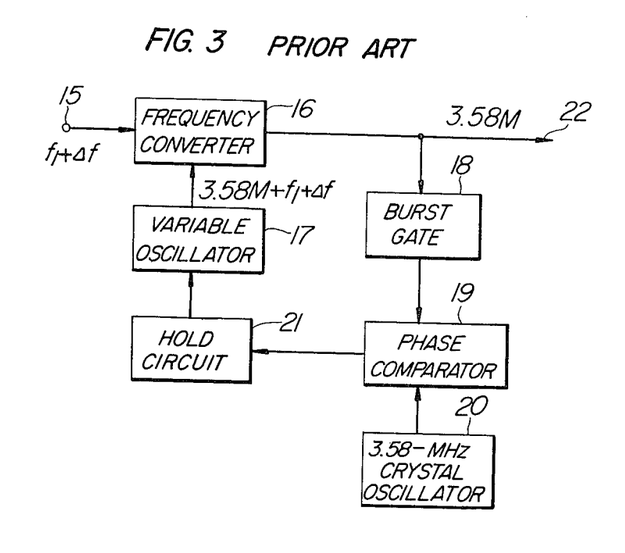

FIGS. 2 and 3 show prior-art examples of the application of the above APC circuit to color video tape recorders. In these examples, a reproduced modulated color signal at frequency $f_1 + \Delta f$ ($\Delta f$ being jitter or timing variation) is converted into a 3.58-MHz modulated color signal free from jitter component.

In FIG. 2, reference numeral 6 designates a terminal to which the reproduced modulated color signal at frequency $f_1 + \Delta f$ is coupled, numeral 7 a burst gate, numeral 8 a 3.58-MHz crystal oscillator, numeral 9 a frequency converter to convert the burst frequency into a frequency 3.58 MHz + $f_1$ + $\Delta F$. Numeral 12 designates a variable oscillator of center frequency 3.58 MHz + $f_1$. Numeral 10 designates a phase comparator comparing the phase of the oscillation of the variable oscillator 12 and the phase of the output of the frequency converter 9 and providing a phase error signal, which is fed to a hold circuit 11 to control the variable oscillator 12 so as to obtain a continuous signal synchronized to the input burst phase. The continuous signal thus obtained is coupled to a frequency converter 13, which also receives the reproduced modulated color signal input and produces the 3.58-MHz modulation color signal free from jitter component appearing at an output terminal 14.

In FIG. 3, reference numeral 15 designates a terminal to which a modulated color signal at a center frequency of $f_1$ and including jitter or timing variation $\Delta f$ is fed. The modulated color signal input is coupled to a frequency converter 16, which also receives a cntinuous output of frequency of 3.58 MHz $+ f_1 + \Delta f$ produced from a variable oscillator 17 and produces a 3.58-MHz difference frequency output. Numeral 18 designates a burst gate, numeral 19 a phase comparator comparing the phase of the oscillation of a 3.58-MHz crystal oscillator with that of the extracted burst signal to produce an error signal, which is fed to a hold circuit 21 to control the oscillating frequency and phase of the variable oscillator 17. The frequency-converted modulated color signal free from jitter component is taken out from an output terminal 22.

In the above examples of FIGS. 2 and 3, the variable oscillator is usually constructed by using an LC oscillator and a variable capacitor as the variable reactance element. Considering the fluctuations introduced in the manufacture of such variable oscillators, the temperature stability obtainable is no better than about $3 \times 10^{-3}$ times the center frequency over an ambient temperature range between 0°C and 60°C. Therefore, if $f_1 \approx 700$ kHz, the drift of the center frequency, 3.58 MHz $+ f_1$, due to ambient temperature variation is about $$4.3 \text{ MHz} \times 3 \times 10^{-3} \approx 13 \text{ kHz}.$$

This order of the center frequency drift is extremely large compared to the theoretical synchronizing pull-in range of the usual APC circuit, which is about $\pm 7.5$ kHz (15 kHz). The drift of the center frequency of the variable oscillator has the same undesirable effects as the variation of the burst frequency has. Thus, the temperature stability of the conventional circuits as shown in FIGS. 2 and 3 is very inferior.

To improve the temperature stability of the circuit dealing with the color signal, it has been proposed to reduce the center frequency of the variable oscillator to be equal to $f_1$.

Figure 4:
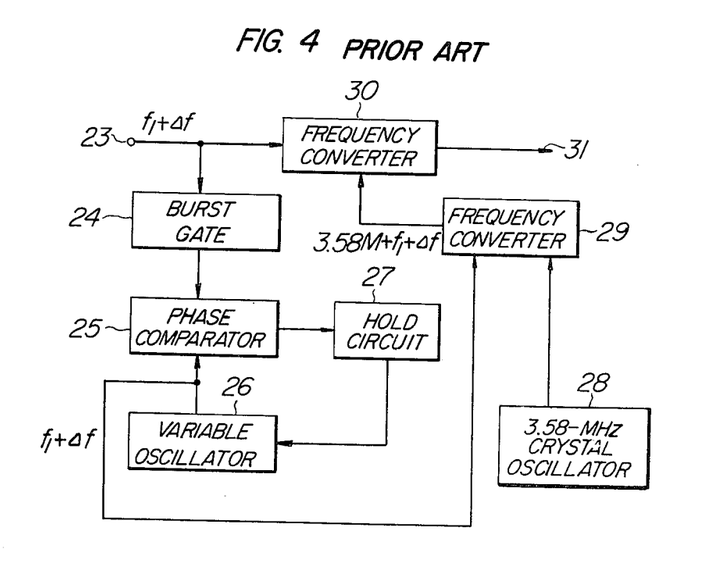

FIG. 4 shows a further prior-art APC circuit, which has variable oscillator 26 of a reduced center frequency. In the Figure, reference numeral 23 designates a terminal to which a modulated color signal at frequency $f_1 + \Delta f$ ($\Delta f$ being jitter or timing variation) is impressed, numeral 24 a burst gate, and numeral 25 a phase comparator to compare the phase of the oscillation of the variable oscillator 26 with that of the extracted burst signal and produce an error signal, which is fed through a hold circuit 27 to control the variable oscillator 26. The output of the variable oscillator 26 is coupled to a frequency converter 29, which also receives the output of a 3.58-MHz crystal oscillator 28 and produces an output at the sum frequency 3.58 MHz $+ f_1 + \Delta f$. The output of the frequency converter 29 is coupled to a further frequency converter 30, which also receives the modulated color signal input of the center frequency of $f_1$ and produces the 3.58-MHz modulation color signal free from jitter component appearing at an output terminal 31.

If $f_1$ is equal to 700 kHz, for instance, the color burst, which usually contains about 10 cycles at 3.58 MHz, is reduced to about 2 cycles, that is, the number of color burst cycles is reduced to 1/5. When this occurs, the phase comparison in the phase comparator takes place an insufficient number of times, so that it is impossible to have enough loop gain. Also, it is likely to suffer from the influence of the transient noise of the burst gate pulse. From the above it can be seen that the synchronizing pull-in frequency range of the APC circuit is less than 2 to 3 kHz and such an APC circuit cannot be put to practical use. For the APC circuit of this construction to be fully effective, the frequency $f_1$ should be more than the order of 3 MHz. This, however, gives rise to problems in the temperature stability as in the examples of FIGS. 2 and 3.

In accordance with the invention, the above drawbacks inherent in the conventional APC circuit are overcome.

Figure 5:
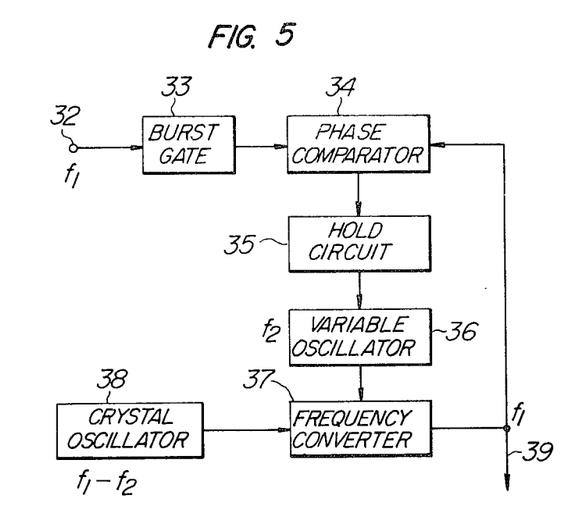
FIG. 5 is a block diagram showing the fundamental circuit construction according to the invention.
Figure 6:
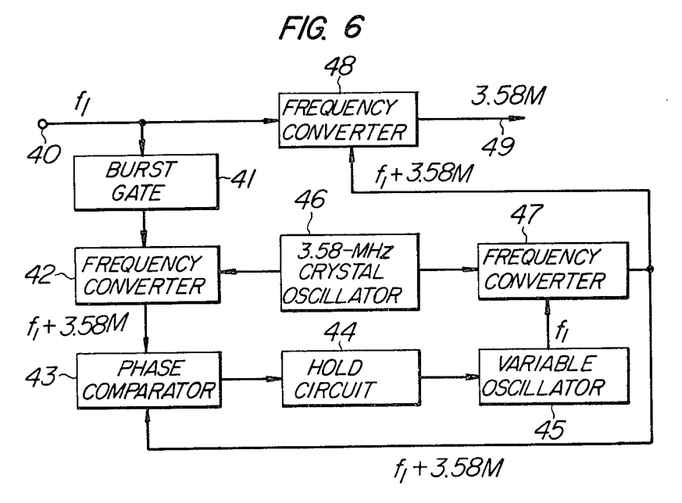
FIGS. 6 and 7 are block diagrams showing examples of the application of the circuit of FIG. 5 to the circuit for removing the jitter component introduced into the modulated color signal recorded and reproduced with a color video tape recorder.
Figure 7:
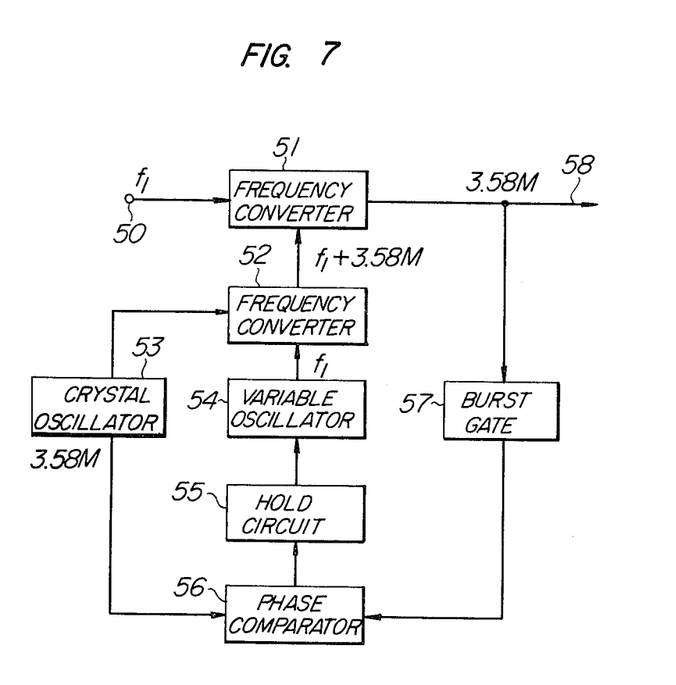
Figure 8:
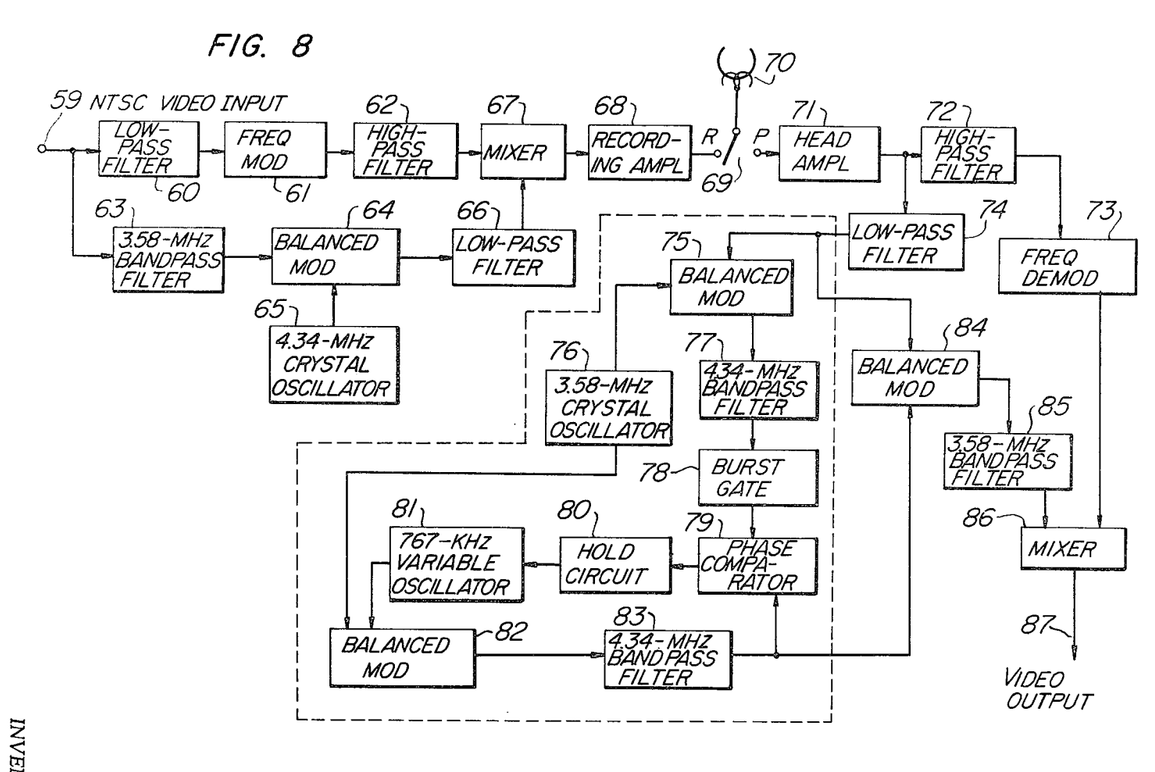
FIG. 8 is a block diagram showing the circuit according to the invention applied to a modulated color signal lower-frequency conversion system, which is one of the color television signal recording and reproducing systems.
Figure 9:
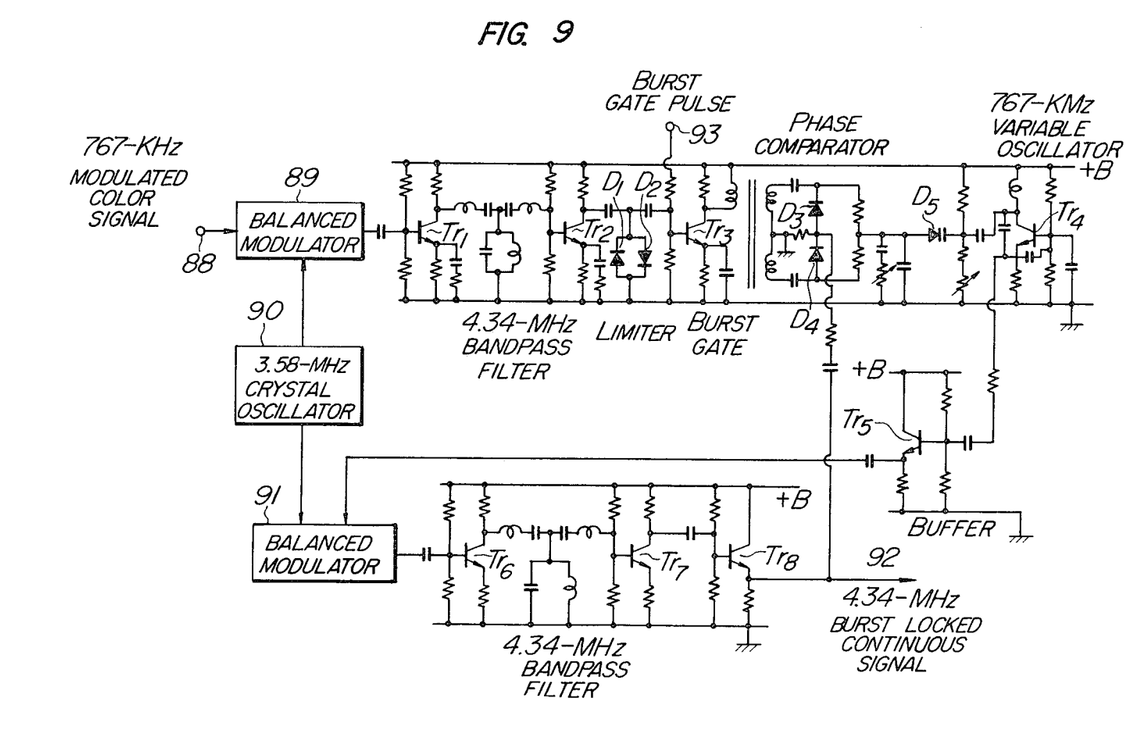
FIG. 9 is a circuit diagram, partly in block form, showing a detailed circuit construction of the part within the dashed loop in FIG. 8.

FIG. 5 shows the fundamental circuit according to the invention. FIGS. 6 and 7 show examples of the application of the circuit of FIG. 5 to the circuit for removing the jitter component introduced into the modulated color signal. FIG. 8 shows the circuit of the invention applied to a modulation color signal low frequency conversion system, which is an excellent system for recording and reproducing the NTSC composite color television signal with a simple video tape recorder. FIG. 9 shows the detailed construction of the part within the dashed loop in FIG. 8.

Referring to FIG. 5, reference numeral 32 designates a terminal to which a signal of center frequency $f_1$ is coupled, numeral 33 a burst gate, and numeral 34 a phase comparator. The phase comparator 34 provides error signals fed through a hold circuit 35 to control the phase of the oscillation of a variable oscillator 36 of center frequency $f_2$. The output of the variable oscillator 36 is coupled to a frequency converter 37, which also receives an output at frequency $f_1 - f_2$ from a crystal oscillator 38 and produces an output of the sum frequency $f_1$, which is in turn fed back to the phase comparator 34 for phase comparison with the extracted burst signal from the burst gate 33.

With this construction, the center frequency of the variable oscillator 36 may be desirably preset by appropriately presetting the frequency of the crystal oscillator 38 even if the burst frequency $f_1$ is above 3 MHz. If $f_1 \approx 4.3$ MHz and $f_1 - f_2 = 3.58$ MHz (frequency of the crystal oscillator), the center frequency $f_2$ of the variable oscillator 36 is $$f_2 \approx 4.3 \text{ MHz} - 3.58 \text{ MHz} = 720 \text{ kHz}.$$

Thus, assuming the temperature stability factor (for a temperature range between 0°C and 60°C) to be $3 \times 10^{-3}$, the drift of the center frequency of the variable oscillator is about 2 kHz, and more than 10 cycles of the burst signal (4.3 MHz) are available in the phase comparator, so that the phase comparator can be operated reliably. Also, an APC pull-in range of about 15 kHz, which is near the theoretical maximum range, may be readily achieved.

In the above case, the APC circuit can be fully effective and reliable operation may be ensured for the drift of the center frequency of the variable oscillator due to temperature variation gives rise to no problems.

Referring now to FIG. 6, which shows the color signal jitter removal circuit based on the preceding circuit construction, reference numeral 40 designates a terminal to which the modulated color signal at center frequency $f_1$ (about 700 kHz) is coupled; numeral 41 a burst gate, and numeral 42 a frequency converter, which receives the extracted burst signal of frequency $f_1$ and the output of a 3.58-MHz crystal oscillator 46 and produces an output at the sum frequency $f_1 + 3.58$ MHz. The output of the frequency converter 42 is fed to a phase comparator 43 providing an error signal fed through a hold circuit 44 to control the oscillation phase of a variable oscillator 45 of center frequency $f_1$.

The output of the variable oscillator 45 is coupled to another frequency converter 47, to which is also coupled the output of the 3.58 MHz crystal oscillator 46, and which produces an output at the sum frequency $f_1$ + 3.58 MHz fed back to the phase comparator 43 for phase comparison with the output of the frequency converter 42. The continuous sum frequency output of the frequency converter 47 is also coupled to a further frequency converter 48, which also receives the modulation color signal input of the center frequency of $f_1$ and produces a 3.58-MHz modulated color signal free from jitter component appearing at an output terminal 49.

In this circuit, the 3.58-MHz crystal oscillator is used for two purposes, which is an advantage in reducing manufacturing costs.

In the circuit of FIG. 7, which is similar to the preceding circuit of FIG. 6, the modulated color signal at center frequency $f_1$ (about 700 kHz) impressed on an input terminal 50 is coupled to a frequency converter 51, which cancels jitter included in the input, and whose output is fed to a burst gate 57 to extract the burst signal fed to a phase comparator 56 for phase comparison with the output of a 3.58-MHz crystal oscillator 53 so as to produce an error signal fed through a hold circuit 55 to control the oscillating phase of a variable oscillator 54. The output of the frequency $f_1$ from the variable oscillator 54 is coupled to a frequency converter, where it is frequency converted in the presence of the 3.58-MHZ crystal oscillator 53 into the sum frequency signal at 3.58 MHz + $f_1$ coupled to the frequency converter 51.

Referring now to FIG. 8, which shows an example of the system for recording and reproducing the NTSC composite color television signal with a simple video tape recorder and using the circuit according to the invention to obtain a steady reproduced NTSC signal, reference numeral 59 designates an NTSC video signal input terminal, numeral 60 a low-pass filter to separate the luminance signal, numeral 61 a frequency modulator to frequency modulate the separated luminance signal, numeral 62 a high-pass filter to block part of the lower sideband of the FM signal, numeral 63 a bandpass filter to separate the modulation color signal at 3.58 MHz, numeral 64 a balanced modulator to convert the 3.58-MHz modulation color signal in the presence of a 4.34-MHz crystal oscillator 65 into a difference frequency signal at about 767 kHz, numeral 66 a low-pass filter, numeral 67 a mixer to combine the FM signal and the difference frequency signal, numeral 68 a recording amplifier, numeral 69 a recording-playback changeover switch, numeral 70 a video head assembly, numeral 71 a head amplifier, numeral 72 a high-pass filter to separate the FM signal, numeral 73 a frequency demodulator, numeral 74 a low-pass filter to separate the frequency converted modulated color signal, numeral 75 a balanced modulator to modulate the output of the low-pass filter 74 in the presence of a 3.58-MHz crystal oscillator 76, numeral 77 a bandpass filter to separate the modulation color signal at the sum frequency of 4.34 MHz, numeral 78 a burst gate to extract the 4.34-MHz burst signal, numeral 79 a phase comparator providing an error signal fed through a hold circuit 80 to control the oscillating phase of a 767-KHz variable oscillator 81, numeral 82 a balanced modulator to modulate the output of the variable oscillator 81 in the presence of the 3.58-MHz crystal oscillator 76, numeral 83 a bandpass filter to separate the sum frequency signal at 4.34 MHz fed back to the phase comparator 79, numeral 84 a balanced modulator to modulate the frequency converted modulated color signal from the low-pass filter 74 in the presence of the continuous 4.34-MHz signal synchronized to the burst phase separated through the bandpass filter 83 to produce the modulation color signal of the difference frequency of 3.58 MHz free from jitter component, numeral 85 a bandpass filter, and numeral 86 a mixer combining the jitter-free 3.58-MHz modulated color signal from the bandpass filter 85 and the demodulated luminance signal from the frequency demodulator 73 to obtain the NTSC video signal reproduction free from jitter component in the modulation color signal, which is taken out from an output terminal 87.

According to this system, the modulated color signal is not frequency modulated but is converted into a lower-frequency signal. This permits recording at longer wavelengths, and the FM carrier provides an a-c bias effect, so that distortion in the reproduced signal may be reduced and an excellent signal-to-noise ratio in the reproduced signal may be obtained.

If the jitter component introduced by the recording and reproducing system is 1 percent pp, the frequency variation in the reproduced modulation color signal is about 8 kHz. With this order of the timing variation, an APC pull-in range of about 15 kHz is sufficient enough to reliably and precisely remove the jitter component.

FIG. 9 shows an example of the detailed circuit construction of the part within the dashed loop in FIG. 8. In the Figure, reference numeral 88 designates an input terminal at which the 767-kHz modulated color signal appears, numeral 89 a balanced modulator corresponding to the balanced modulator 75 in FIG. 8, numeral 90 a 3.58-MHz crystal oscillator, numeral 91 a balanced modulator, and numeral 92 an output terminal at which the continuous signal phase locked to the 4.34-MHz burst signal appears. The circuit consisting of transistors $Tr_1$ and $Tr_2$ and diodes $D_1$ and $D_2$ constitute the 4.3-MHz bandpass filter and a burst level limiter. A transistor $Tr_3$ constitutes the burst gate, and burst gate pulses produced from the horizontal sync signal are impressed on a terminal 93. The circuit of diodes $D_3$ and $D_4$ constitute the phase comparator, $D_5$ is a variable capacitor, a transistor $TR_4$ constitutes the 767-kHz variable oscillator, a transistor $Tr_5$ constitutes an EF, and the circuit of transistors $Tr_6$, $Tr_7$ and $Tr_8$ constitute the 4.34-MHz bandpass filter and amplifier.

The foregoing description is concerned with producing a continuous signal synchronized to an intermittent burst signal subjected to timing variations. It is to be understood that the present invention is similarly effective for producing a continuous signal phase locked to a continuous signal subjected to timing variations in lieu of a burst signal.

As has been described in the foregoing, according to the invention it is possible to have an APC circuit whose temperature stability is excellent and which can be fully effective. The circuit according to the invention provides a great benefits when applied to a circuit for removing the jitter component introduced into the modulated color signal in the NTSC or PAL color television signal recorded and reproduced with a video tape recorder.

What we claim is:

1. A signal processing system for removing a jitter component in a modulated color signal, which is previously converted into a low band signal, of a composite color television signal comprising a variable oscillator, the oscillation frequency and phase of said variable oscillator being controlled by an applied control signal, a stable and fixed oscillator providing an output of higher frequency than the oscillation frequency of said variable oscillator, first frequency converter means connected to said variable oscillator and fixed oscillator for converting the output of said variable oscillator into a higher frequency signal by means of said higher frequency of said fixed oscillator, phase comparator means receiving the output of said first frequency converter means and a reference signal for producing an error signal according to the phase difference between the output of said first frequency converter means and the reference signal, means for applying said error signal to said variable oscillator as said control signal to control the oscillation frequency and phase of said variable oscillator, said oscillation frequency being lower than that of said reference signal, second frequency converter means connected to said first frequency converter means and receiving the modulated color signal for producing a difference signal of the output of said first frequency converter means and the modulated color signal, means for separating a burst signal from the modulated color signal, third frequency converter means connected to said burst signal separating means and fixed oscillator for converting said separated burst signal into a higher frequency signal by means of said higher frequency of said fixed oscillator, and means for connecting said converted burst signal to said phase comparator as said reference signal.

2. A signal processing system for a composite color television signal comprising: means for separating a luminance signal from a color signal including a color burst signal in the standard color television signal, means for frequency modulating the separated luminance signal, first frequency converter means for frequency converting the separated color signal into a first signal of a frequency belonging to a low band of a frequency band of the modulated luminance signal, first mixer means for mixing said modulated luminance signal and said first signal, means for recording and reproducing a mixed output signal of said mixer means in and from a recording medium, means for separating said modulated luminance signal from said first signal in the reproduced mixed signal which has a jitter component, demodulator means for demodulating said reproduced and separated modulated luminance signal, a signal source for generating a second signal of a frequency equal to that of the color subcarrier of the standard color television signal, second frequency converter means receiving said reproduced and separated first signal and said second signal for frequency converting said reproduced and separated first signal into a third signal of a higher frequency, means for separating the color burst signal from said third signal, variable oscillator means having a center frequency substantially equal to that of said first signal, the oscillation frequency and phase of said variable oscillator means being controlled by an applied control signal, third frequency converter means receiving the output of said variable oscillator means and said second signal for frequency converting said second signal into a fourth signal of a higher fequency, phase comparator means for comparing the phase of said color burst signal with that of said fourth signal and producing an output according to the phase difference therebetween, means for applying said output of said phase comparator means to said variable oscillator means as said control signal, fourth frequency converter means receiving said fourth signal and said reproduced and separated first signal for frequency converting said reproduced and separated first signal into a fifth signal of a frequency equal to that of the color subcarrier of the standard color television signal, and second mixer means for mixing said fifth signal and the demodulated luminance signal derived from said demodulator means to obtain the standard color television signal.

3. A signal processing system for a composite color television signal comprising: means for separating a luminance signal from a color signal including a color burst signal in the standard color television signal; means for frequency modulating the separated luminance signal; first frequency converter means for frequency converting the separated color signal into a first signal of a frequency belonging to a low band of a frequency band of the modulated luminance signal; first mixer means for mixing said modulated luminance signal and said first signal; means for recording and reproducing a mixed output signal of said mixer means in and from a recording medium; means for separating said modulated luminance signal from said first signal in the reproduced mixed signal which has a jitter component; demodulator means for demodulating said reproduced and separated modulated luminance signal; a signal source for generating a second signal; variable oscillator means having a center frequency substantially lower than that of said second signal, the oscillation frequency and phase of said variable oscillator means being controlled by an applied control signal; second frequency converter means receiving an output of said variable oscillator means and said second signal for frequency converting said output of said variable oscillator means into a third signal, the frequency of which is higher than that of said first signal by the frequency of the color subcarrier of the standard color television signal; third frequency converter means receiving said third signal and said reproduced and separated first signal for frequency converting said reproduced and separated first signal into a fourth signal of a frequency equal to that of the color subcarrier of the standard color television signal; means for separating a color burst signal from said fourth signal; phase comparator means for comparing the phase of said second signal with that of said color burst signal and producing an output according to the phase difference therebetween; means for applying said output of said phase comparator means to said variable oscillator means as said control signal, a single closed loop for controlling the oscillation frequency and phase of said variable oscillator consisting of said second frequency converter means, third frequency converter means, color burst signal separating means, phase comparator means and applying means; and second mixer means for mixing said fourth signal and the demodulated luminance signal derived from said demodulator means to obtain the standard color television signal, whereby the oscillation frequency of said variable oscillator is sufficiently low for locking said closed loop despite center frequency drift caused by changes in ambient temperature.

* * * * *